(12) United States Patent
Faruque

(10) Patent No.: US 6,647,059 B1
(45) Date of Patent: Nov. 11, 2003

(54) CODE DIVISION MULTIPLE ACCESS CABLE MODEM

(75) Inventor: Saleh Faruque, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/455,090

(22) Filed: Dec. 6, 1999

Related U.S. Application Data

(60) Provisional application No. 60/119,682, filed on Feb. 11, 1999.

(51) Int. Cl.[7] .................................................. H04B 1/38
(52) U.S. Cl. ........................................ 375/222; 375/246
(58) Field of Search ................................ 375/130, 134, 375/137, 145, 149, 219, 222, 240, 240.27, 240.1, 240.11, 240.23, 240.24, 240.25, 246

(56) References Cited

U.S. PATENT DOCUMENTS 5,504,774 A * 4/1996 Takai et al. .................. 375/134
5,617,333 A * 4/1997 Oyamada et al. ........... 709/247
5,995,539 A * 11/1999 Miller ......................... 375/222
6,263,017 B1 * 7/2001 Miller ......................... 375/222

OTHER PUBLICATIONS

Saleh Faruque, *Cellular Mobile Systems Engineering*, Artech House, 1996, pp. 109–110.

* cited by examiner

Primary Examiner—Don N. Vo
Assistant Examiner—Pankaj Kumar
(74) Attorney, Agent, or Firm—Haynes and Boone, LLP

(57) ABSTRACT

A low-cost data communication system using modems is disclosed. In the proposed system and method, a binary incoming data stream is split into several parallel sub streams by an encoding modem. These parallel sub streams are mapped into a set of unique orthogonal short-codes and then modulated by a bank of modulators. Thereafter, the modulated data are combined and transmitted through a wired communication channel such as a cable or optical fiber channel. Since there are no multipath components in cables or fiber optical communication channel, the composite outgoing data stream from the encoding modem remains orthogonal during the transmission and maximizes CDMA capacity. A decoding modem can receive encoding information from the encoding modem and appropriately decode the transmitted information.

9 Claims, 3 Drawing Sheets

CODE DIVISION MULTIPLE ACCESS CABLE MODEM

CROSS REFERENCE

This application claims the benefit of U.S. Provisional Application Serial No. 60/119,682, which was filed on Feb. 11, 1999.

BACKGROUND OF THE INVENTION

The present invention relates generally to telecommunication networks, and more particularly, to a system and method for transmitting data through a wired communication channel using an encoding modem and a decoding modem.

In the modern telecommunication industry, improved technologies for transmitting information through an efficient medium are always needed. Technologies for fast data transmission keep evolving at a rapid pace. For the wired world, modems are still one of the key instruments for users to exchange information in a computer network. However, modems in general suffer from numerous delays. For example, current dial-up modems are limited to a speed of about 56 kb/s using data compression technology. Moreover, in order not to sacrifice the accuracy of the information being transmitted, a Forward Error Correction Code (FECC) technique must be implemented to embed sufficient redundant information in the transmitted data, thereby reducing the overall data bandwidth. For an Asymmetric Digital Subscriber Line (ADSL) modem, the current technology provides a transmission speed about 1.5 Mb/s for up stream data flow, and up to 9 Mb/s for down stream data flow. But it is with the assistance of a more complex data compression technology, which increases packet loss rate, and thus in turn damages the integrity of the data transmitted.

For the wireless world, Code Division Multiple Access technology has proved to be a leading communication technology for voice data transmission. One advantage of CDMA technology is that multiple users can share a common frequency without having significant interference. The core technology providing this leading edge is an orthogonal coding technique. In essence, each user is assigned a unique orthogonal code, which enables the user to remain unaffected by other users of the same frequency. However, there is one restriction—all users using the same frequency must be synchronized in time to the accuracy of a fraction of one bit of an orthogonal code. Otherwise, a desired zero cross-correlation property of orthogonal codes will be lost.

In order to meet this synchronization requirement, a unique pilot signal is utilized to synchronize all users. Even so, it is still difficult to maintain perfect synchronization in multi-path environments since multi-path components are, by their very nature, unpredictable. As a result, the number of CDMA users (N) can be represented by the following capacity equation:

$$N \propto \frac{W/R_b}{E_b/N_o} \quad (1)$$

where W=Total Available Bandwidth, $R_b$=bit rate, $E_b$=Energy/bit, $N_o$=Noise spectral density. The ratio $W/R_b$ is known as the "process gain," and the ratio $E_b/N_o$ is expressed in decibel. Since it is highly desirable to minimize $E_b/N_o$ so that CDMA capacity can be enhanced, various techniques have been deployed. Notwithstanding these techniques, the system capacity provided by CDMA technology is still significantly impacted by the fact that it is practically impossible to eliminate multi-path components from a wireless environment.

However, this detrimental impact does not exist in a wired environment where multi-path components are negligibly small or practically absent. Therefore, what is needed is a communication application based on CDMA technology for providing fast data transfer in a wired environment.

SUMMARY OF THE INVENTION

In the present invention, a system and method for data communication using modems is disclosed. In one embodiment, the system includes an encoding modem where an input binary data stream is split into several parallel sub streams. These parallel sub streams are mapped into a set of unique orthogonal short-codes and then modulated by a bank of modulators, and thereafter, combined and transmitted through a wired communication channel such as cable or optical fiber. Since there are no multipath components in the wired communication channel, the composite outgoing data stream remains orthogonal during the transmission, thus maximizing transmission capacity.

By implementing the present invention, a dial-up modem using CDMA technology can offer a speed of at least 128 kb/s without data compression and with a far less complicated FECC process. Similarly, an ADSL modem using CDMA technology can offer a speed of at least 18 Mb/s without data compression.

The system may also include a decoding modem that can easily decode information encoded and transmitted by the encoding modem.

DESCRIPTION OF THE PREFERRED EMBODIMENT

Figure 1:
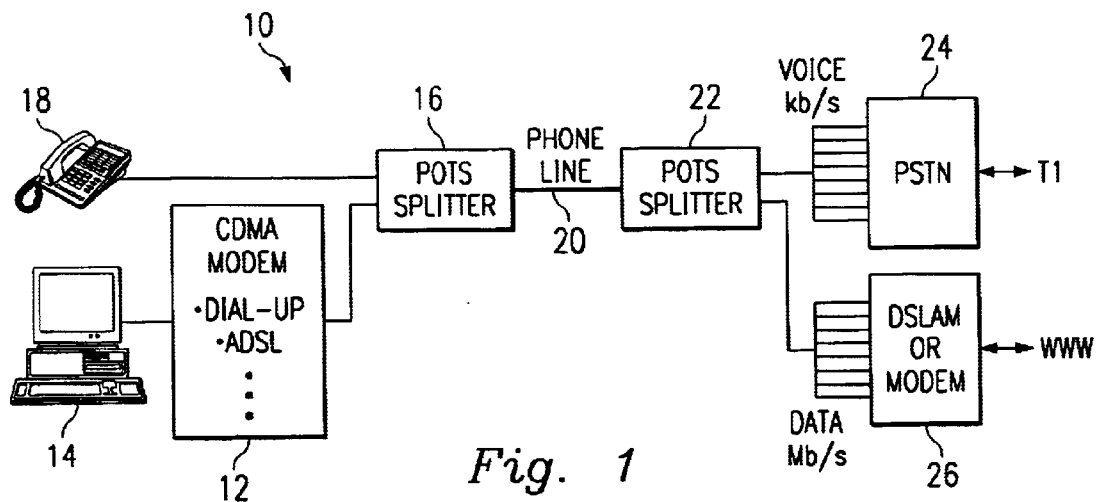
FIG. 1 is a schematic for one embodiment of a communication system implemented with a set of modems in accordance with the present invention.

Referring now to FIG. 1, a schematic for a communication system 10 implemented with a set of encoding and decoding modems is shown. An encoding modem 12 connects a data source such as a computer 14 to a Plain Old Telephone Service (POTS) splitter 16. The POTS splitter also connects to a voice source such as a telephone 18. The POTS splitter basically splits the transmission of voice and data information based on their different frequencies. Through a wired connection such as a phone line 20, data and voice information are sent to another POTS splitter 22 which further directs the voice and data information to corresponding processor circuit such as a Public Switch Telephone Network (PSTN) 24 and a decoding CDMA modem or a similar instrument such as a Digial Subscriber Line Access Multiplexer (DSLAM) 26 which has the ability to decode the information encoded by the encoding modem 12.

Figure 2:
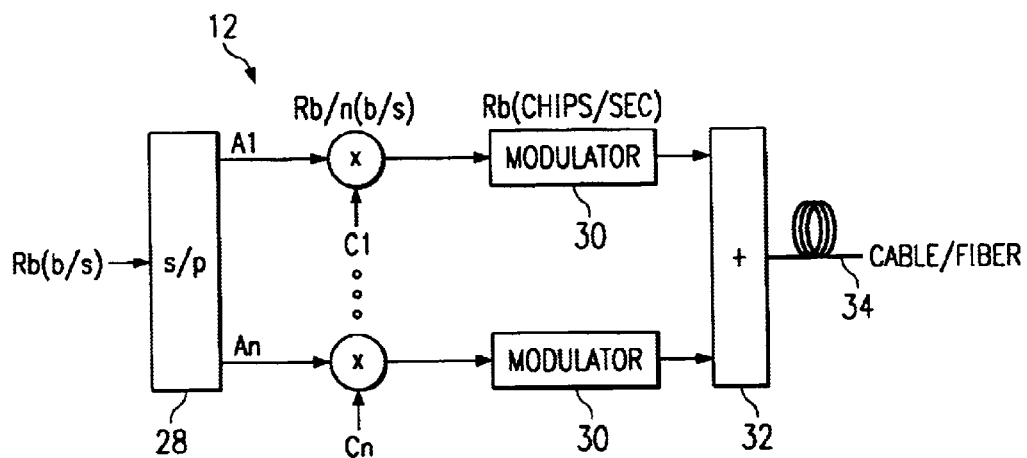
FIG. 2 is a schematic of an encoding modem of the communication system of FIG. 1 according to one embodiment of the present invention.

FIG. 2 illustrates a schematic of the encoding modem 12 of FIG. 1 according to the present invention. The encoding modem 12 utilizes a combination of parallel signal processing, orthogonal coding, and modulation, all of which are completed on one platform or in one instrument. In essence, an incoming data stream with a litrate Rb(b/s) can be split into n-parallel sub streams, after being processed in the splitter 28. Each sub stream, now with its speed reduced to Rb/n (b/s), is multiplied by a unique n-bit orthogonal short-code, $c_1(t), c_2(t), \ldots, c_n(t)$ to yield a coded stream at rate $n(Rb/n)=Rb$ (b/s). A series of identical modulators 30 subsequently modulate each coded stream to obtain:

$$c_1(t)s_1(t), c_2(t)s_2(t), \ldots, c_n(t)s_n(t) \quad (3)$$

where $s_i(t)$ being the respective modulating signal according to the equation:

$$s_i(t) = A(t)\cos[\{\omega_c t + \phi_i(t)\}] \quad (4)$$

Since each modulated stream is now in the orthogonal space, they can be combined in a combiner 32 and expressed as a linear combination of a series of non-interfering signals:

$$c_1(t)s_1(t) + c_2(t)s_2(t) + \ldots + c_n(t)s_n(t) \quad (5)$$

which can then be transmitted through a cable or fiber optical channel 34. A channel occupancy is therefore at:

$$BW = R_b(1+\alpha) \quad (6)$$

where $\alpha$ the roll-off factor due to post-modulation filter, which typically equals to 0.1 to 0.2, and BW is the needed bandwidth. Thus a coded and modulated outgoing data stream is obtained whose transmission bandwidth is determined by $\alpha$, which is a parameter that may be defined by a user.

Figure 3:
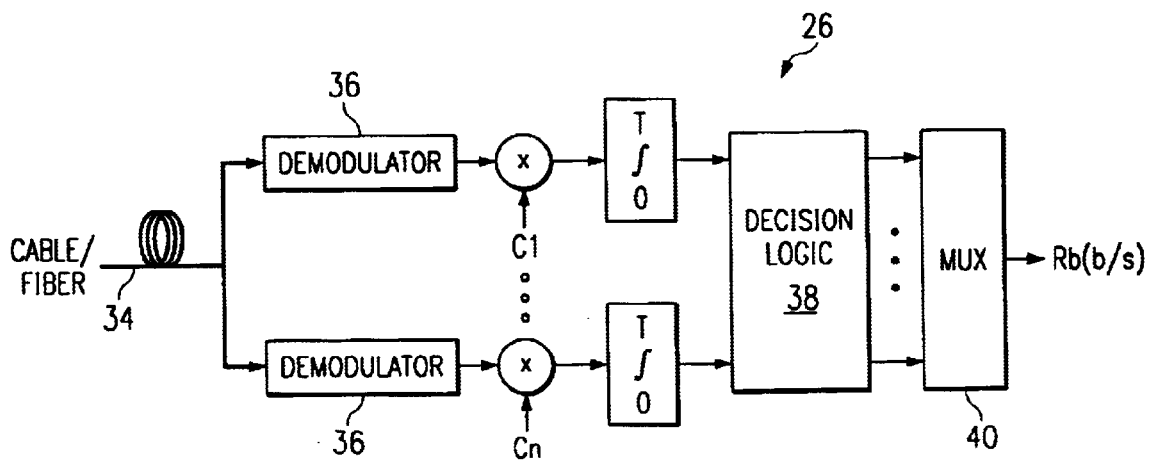
FIG. 3 shows a detailed schematic of a decoding modem of the communication system of FIG. 1 according to one embodiment of the present invention.

FIG. 3 illustrates the schematic of a decoding CDMA modem 26. From the receiving or decoding side of the system, the decoding modem 26 extracts needed data information. After the incoming information stream is demodulated by a series of demodulators 36, each output is simultaneously multiplied by the respective orthogonal code to yield:

$$s_1(t) = c_1^2(t)s_1(t) + c_1(t)c_2(t)s_2(t) + \ldots, c_1(t)c_n(t)s_n(t)$$

$$s_2(t) = c_2(t)c_1(t)s_1(t) + c_2^2(t)s_2(t) + \ldots, c_2(t)c_n(t)s_n(t)$$

$$s_n(t) = c_n(t)c_1(t)s_1(t) + c_n(t)c_2(t)s_2(t) + , \ldots, c_n^2(t)s_n(t) \quad (7)$$

In the absence of multi-path components, knowing information about both an auto correlation and a cross correlation, and through a decision logic block 38 and a multiplexer 40, the transmitted information can be retrieved.

The auto correlation and cross correlation information can be expressed in equations shown below:

$$\int_0^T c_i^2(t) = 1 \quad \text{(Auto Correlation)} \quad (8)$$

$$\int_0^T c_i(t)c_j(t) = 0 \text{ for } i \neq j \quad \text{(Cross Correlation)}$$

Figure 4A:
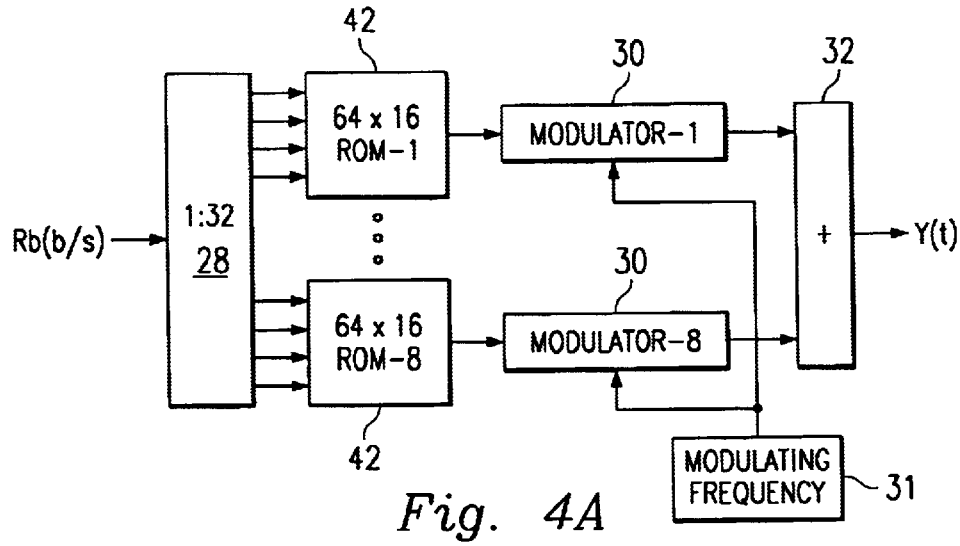
FIG. 4A is a schematic diagram for a Rate ½ encoding modem according to one embodiment of the invention.

FIG. 4A is a schematic diagram for a Rate ½ encoding modem dividing an incoming data stream into 32 parallel sub streams according to one embodiment of the invention. Once the splitter 28 divides the incoming data stream Rb into sub streams, every four sub streams are fed into a Read Only Memory (ROM) 42. Since the input is four (4) bits, the ROM has to be a n×16 matrix whereas four input bits select a unique output of a predetermined length of n bits. In this example, the length of each row in the ROM is set at 64 bits. Therefore, in this embodiment, the ROM is a 64×16 ROM and it takes altogether eight (8) such ROMs to process the entire incoming data stream. The output of each ROM 42, which is a unique 64-bit orthogonal or antipodal code, will be modulated in a corresponding modulator 30 at a supplying modulating frequency 31 provided by the encoding modem 12. Then, the sub streams are combined again and the aggregate output Y(t) is transmitted through a cable or fiber optical channel. As a result, the transmission bandwidth will be Rb(64/32) Hz, or in another word, the code rate is 32/64, which is one half (½) of that of the incoming data stream.

Figure 4B:
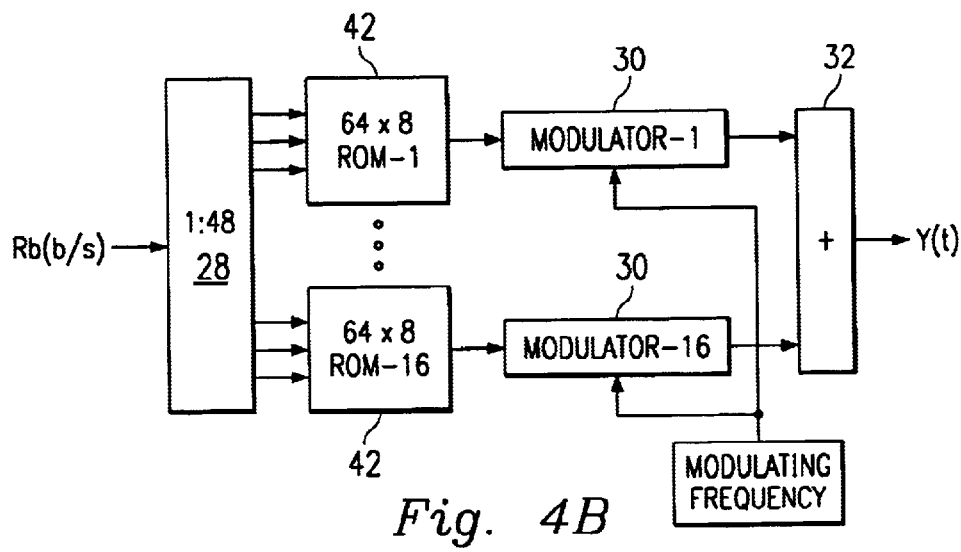
FIG. 4B is a schematic diagram for a Rate ¾ encoding modem according to another embodiment of the present invention.
Figure 4C:
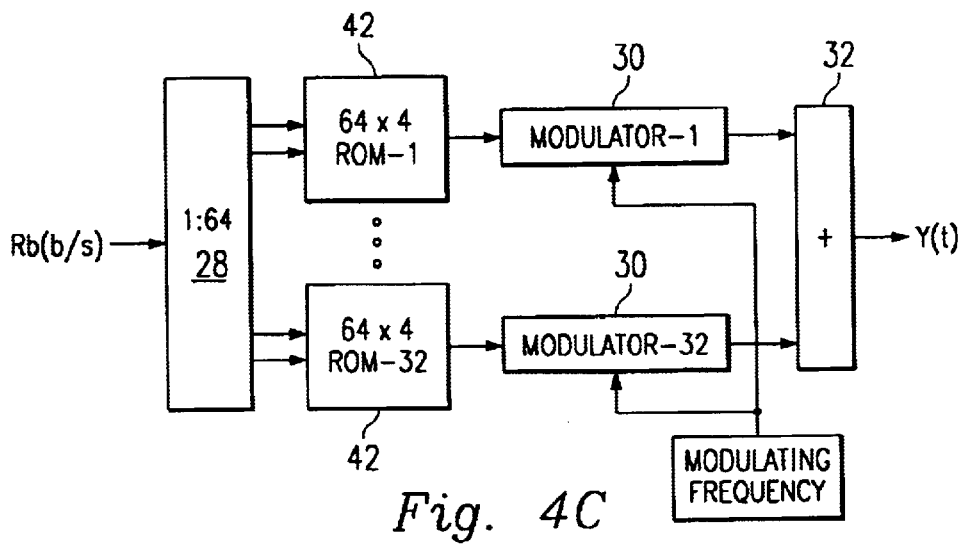
FIG. 4C is a schematic diagram for a Rate 1 encoding modem according to yet another embodiment of the present invention.

FIG. 4B illustrates a schematic diagram for a Rate ¾ encoding modem and FIG. 4C illustrates one for a Rate 1 encoding modem 12. They use the similar framework as the Rate ½ encoding modem. The difference lies in that the splitter 28 in the Rate ¾ modem generates 48 sub streams and uses 16 n×8 ROMs, and for the Rate 1 modem, 64 sub streams and 32 n×4 ROMs. The resulting bandwidth for the Rate ¾ modem is Rb(64/48), and the code rate is three fourth (¾). Similarly for the Rate 1 modem, the resulting bandwidth is Rb(64/64), and the code rate is one (1). The Rate 1 modem is the best among the above three embodiments since it does not expand any bandwidth. Therefore, it is ideal for high speed data transmission. From the above embodiments of the present invention, it is clear that an incoming data bit rate bears the following mathematical relation with the outgoing data bit rate:

$$R_b * N/K = R_{out} \quad (9)$$

and $$K = \text{Log } M/\text{Log } 2 \quad (10)$$

wherein $R_b$ is the bit rate for the incoming data, N is the length of the selected orthogonal code, and M is a binary number greater or equal to 2. Once the outgoing data bit rate is chosen by a user, the user may further decide on the length of the orthogonal code that is needed for the encoding process, which in turn decides the value of K. The number of sub streams of the incoming data and the column size of the ROMs used can then be decided accordingly.

Besides the advantage of encoding a data stream without demanding significant bandwidth expansion, the present invention also provides an important feature of controlling error correction. An orthogonal code typically has an equal number of 1's and 0's. This is to say that a n-bit orthogonal code has (n/2) 1's and (n/2) 0's. Taking a 16-bit orthogonal code as an example, it has eight (8) orthogonal codes and eight (8) antipodal codes.

Since the distance between these two codes is n/2, an impaired orthogonal code can be reliably decoded by setting a threshold midway between two orthogonal codes, i.e., at n/4. For example, a decision mechanism can be implemented for an incoming impaired Walsh code to be examined for correlation with the neighboring codes for a possible match. The decision criterion for a valid code can be that a n-bit comparison must yield less than n/4 errors, otherwise a false detection will occur. This is governed by the following correlation process, where a pair of n-bit codes $x_1, x_2, \ldots, x_n$ and $y_1, y_2, \ldots, y_n$ are compared to yield:

$$R(x, y) = \sum_{i=1}^{n} x_i y_i \geq \left(n - \frac{n}{4}\right) + 1 \quad \text{or} \tag{9}$$

$$R(x, y) \geq \frac{3n}{4} + 1$$

Therefore the average number of symbol errors that can be corrected by means of this process will be:

$$t = n - R(x, y) = \frac{n}{4} - 1 \tag{10}$$

where n is the code length. For example, a single error correcting orthogonal code can be constructed by means of an 8-bit orthogonal code (n=8). Similarly, a three error correcting orthogonal code can be constructed by means of a 16-bit orthogonal code (n=16), and so on. The Table 1 below shows a few orthogonal short-codes and the corresponding error correcting capabilities:

TABLE 1

| n | t |
|---|---|
| 8 | 1 |
| 16 | 3 |
| 32 | 7 |
| 64 | 15 |
| : | : |

Thus the error correction rate can be readily predetermined by using the above table to decide the length of the orthogonal codes.

Further, a measure of coding gain can be obtained by comparing a word error with coding, Pe(WEC), to a word error without coding, Pe(WEU). If S=Transmit power, T=Symbol Duration, then the coded and uncoded symbol energy will be:

$$ST/n = \text{Coded symbol energy} \tag{11}$$

$$ST/k = \text{Uncoded symbol energy} \tag{12}$$

where n is the number of coded symbols, and k is the number of uncoded symbols. Since n>k, the coded symbol energy will be less than the uncoded symbol energy, which translates into poor symbol error performance due to coding. However, comparing the coded word error rate, Pe(WEC), with the uncoded word error rate, Pe(WEU), proves that the net gain in word error rate due to coding is significantly improved, as shown later in FIGS. 5A, 5B and 5C.

Figure 5A:
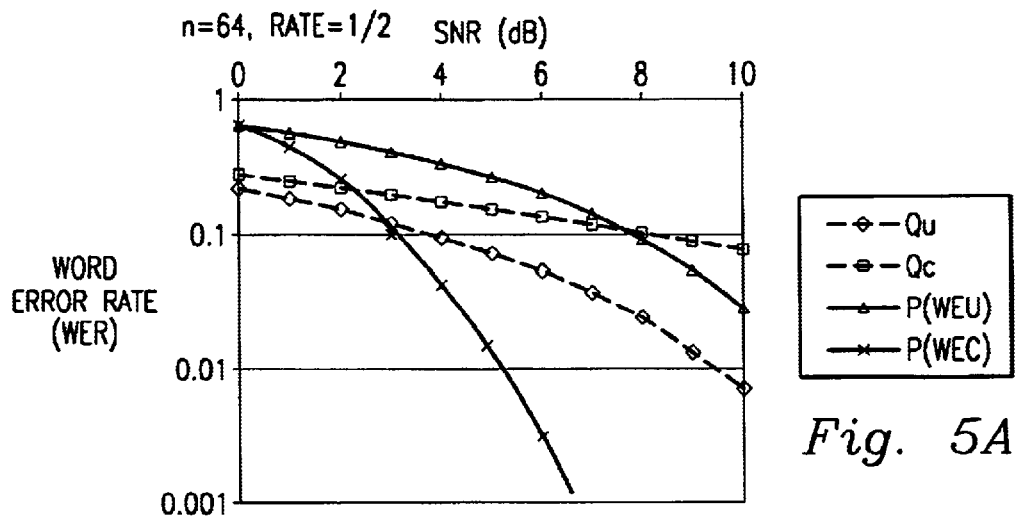
FIG. 5A illustrates a simulation plot showing an improvement of a word error rate using the Rate ½ encoding modem of FIG. 4A.
Figure 5B:
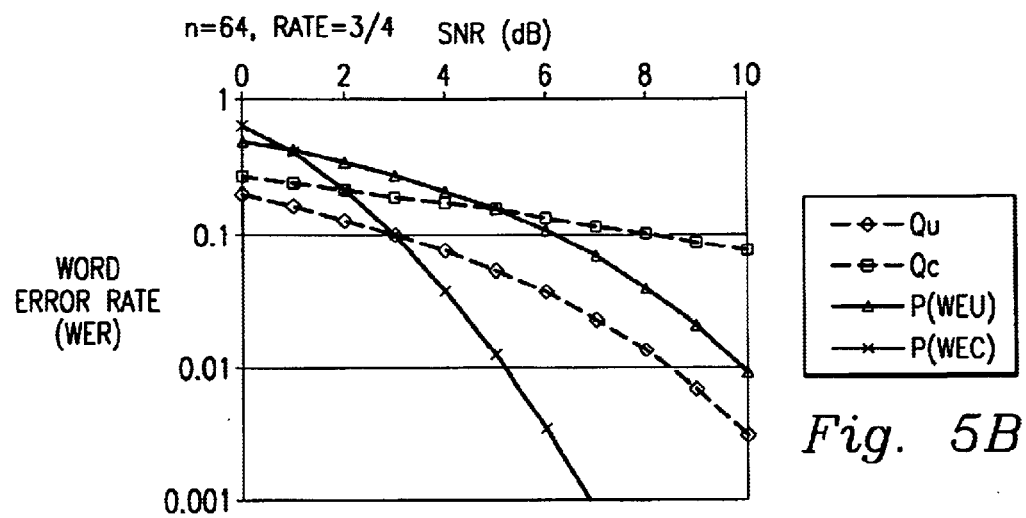
FIG. 5B illustrates a simulation plot showing an improvement of a word error rate using the Rate ¾ encoding modem of FIG. 4B.
Figure 5C:
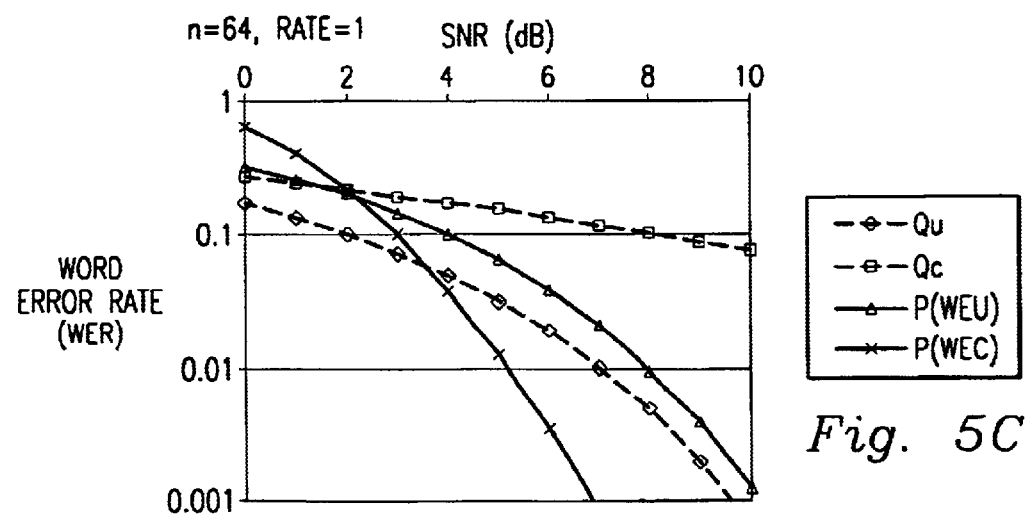
FIG. 5C illustrates a simulation plot showing an improvement of a word error rate using the Rate 1 encoding modem of FIG. 4C.

FIGS. 5A, 5B and 5C are simulation plots showing word error rate using the encoding CDMA modem. The mathematical expressions for error rates are given by:

$$Pe(WEC) = \sum_{i=t+1}^{n} \binom{n}{i} Q_c^i (1 - Q_c)^{n-i} \tag{13}$$

$$Pe(WEU) = 1 - (1 - Q_c)^k \tag{14}$$

Where Qc and Qu are coded and uncoded symbol error rates respectively. With coherent Phase Shift Keying modulations, these error probabilities are computed as $$Q_c = \frac{1}{2} \text{erfc}\left(\sqrt{\frac{ST}{nNo}}\right) \tag{15}$$

$$Q_u = \frac{1}{2} \text{erfc}\left(\sqrt{\frac{ST}{kN_o}}\right) \tag{16}$$

Equations 13,14,15,& 16 are plotted in FIGS. 5A, 5B and 5C for n=64. It is also noted that a Bit Error Rate performance improves with longer code length (not shown). Moreover, the coding gain decreases as the code rate increases. It is also observed that a significant coding gain is obtained with n>32, and no significant bandwidth expansion is necessary.

The above disclosure provides many different embodiments, or examples, for implementing different features of the invention. Techniques and requirements that are only specific to certain embodiments may be imported into other embodiments. Also, specific examples of components, and processes are described to help clarify the invention. These are, of course, merely examples and are not intended to limit the invention from that described in the claims. For example, the present invention is not limited to a particular encoding technology, and any other similar encoding technology may be implemented as well. While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method for data communication through a wired channel, the method comprising:
   orthogonally encoding data information by an encoding modem;
   transmitting the encoded data through the wired communication channel; and
   decoding the encoded data by a decoding modem,
   wherein a transmission bandwidth is efficiently chosen by the encoding modem, and
   wherein the step of encoding further includes:
     splitting the data information into a first number of sub streams of data;
     encoding the sub streams with unique orthogonal codes each having a second number of bits;
     modulating each encoded sub stream by a modulating signal; and
     combining the modulated sub streams into one outgoing data stream,
   wherein the first number is determined by an incoming transmission bit rate for the data information, a transmission bit rate for the outgoing data stream, and the second number.

2. A method for encoding data and communicating the same through a wired channel, the method comprising the steps of:

splitting an incoming data stream by a first number of sub streams;

feeding a second number of Read Only Memories (ROM) with a third number of sub streams for encoding the sub streams by orthogonal codes;

modulating the second number of outputs from the ROMs by a modulating signal; and combining all modulated outputs from the ROMs into an outgoing data stream, wherein the first number and the second number are selected accordingly for achieving transmission bandwidth efficiency.

3. The method of claim 2 whereas the first number equals one of either 32, 48 or 64 and the second number is one of either 8, 16, or 32 respectively.

4. The method of claim 2 wherein the first number is determined by a transmission bit rate for the incoming data stream, a transmission bit rate for the outgoing data stream, and the length of the orthogonal code.

5. A system for data communication through a wired channel, the system comprising:

an encoding modem for orthogonally encoding an incoming data stream;

a decoding modem for decoding the encoded data; and a wired communication channel connecting the encoding and decoding modem for communicating the data therebetween, wherein transmission bandwidth efficiency is achieved by orthogonally encoding the incoming data stream; and wherein the encoding modem further comprises:

a splitter for splitting the data information into a first number of sub streams of data;

a second number of encoders for encoding the sub streams by orthogonal short codes;

a second number of modulators for modulating each encoded sub stream by a modulating signal; and a combiner for combining the modulated sub streams into one outgoing data stream;

wherein the first number is determined by a transmission bit rate for the incoming data stream, a transmission bit rate for the outgoing data stream, and the length of the orthogonal code.

6. A method for encoding data information with error correction capability, the method comprising the steps of:

splitting an incoming data stream into a first number of sub streams of data;

encoding the sub streams with orthogonal codes;

modulating each encoded sub stream by a modulating signal; and combining the modulated sub stream into one outgoing data stream, wherein a word error rate is reduced by the above step, and wherein the first number is determined by a transmission bit rate for the incoming data stream, a transmission bit rate for the outgoing data stream, and the length of the orthogonal codes.

7. The method of claim 6 wherein the step of encoding uses at least one Read Only Memory for processing the sub streams of data.

8. The method of claim 6 wherein each encoded sub stream is a selected orthogonal code.

9. The method of claim 6 wherein the first number is at least 32.

* * * * *